US012608678B2

(12) United States Patent
Li et al.

(10) Patent No.: US 12,608,678 B2
(45) Date of Patent: Apr. 21, 2026

(54) INTEGRATION OF ENTERPRISE SOFTWARE APPLICATIONS TO SUPPORT LOGISTICAL ANALYSIS

(71) Applicant: SAP SE, Walldorf (DE)

(72) Inventors: Dexian Li, Shanghai (CN); Yun Jin, Shanghai (CN); Zichao Song, Shanghai (CN); Hanmei Zhang, Shanghai (CN)

(73) Assignee: SAP SE, Walldorf (DE)

( * ) Notice: Subject to any disclaimer, the term of this patent is extended or adjusted under 35 U.S.C. 154(b) by 460 days.

(21) Appl. No.: 18/068,915

(22) Filed: Dec. 20, 2022

(65) Prior Publication Data

US 2024/0202657 A1     Jun. 20, 2024

(51) Int. Cl.
G06Q 10/087 (2023.01)

(52) U.S. Cl.
CPC ................................. G06Q 10/087 (2013.01)

(58) Field of Classification Search
CPC .................................................... G06Q 10/087
See application file for complete search history.

(56) References Cited

U.S. PATENT DOCUMENTS

| | | | |
|---|---|---|---|
| 2013/0238349 A1* | 9/2013 | Sethumadhavan | .... G16H 40/67 705/2 |
| 2022/0300515 A1* | 9/2022 | Hsiao | .................. G06F 16/2477 |

* cited by examiner

*Primary Examiner* — Rokib Masud
(74) *Attorney, Agent, or Firm* — Mintz Levin Cohn Ferris Glovsky and Popeo, P.C.

(57) ABSTRACT

A method may include an integration microservice receiving a fetch request to fetch tracking data associated with a first enterprise software application. The tracking data may be associated with a tracking model tracking a fulfilment cycle of each order item in an order. The integration microservice may determine whether a first capacity of a tenant associated with the fetch request is able to accommodate a job fulfilling the fetch request. If the first capacity of the tenant is able to accommodate the job fulfilling the fetch request, the integration microservice may distribute the job to an instance of a data load microservice selected based on a second capacity of that instance of the data load microservice. The job may be performed by the instance of the data load microservice by sending the tracking data to a second enterprise software application to perform various analytical tasks based on the tracking data.

20 Claims, 12 Drawing Sheets

300

II_JOB_INFO

PK   ID: NVARCHAR(36)

PROCESSOR_ORDINAL: INTEGER

ZONE_ID: NVARCHAR(36)

RESOURCE_LEVEL: INTEGER

JOB_START_TIME: TIMESTAMP

JOB_END_TIME: TIMESTAMP

JOB_STATUS: NVARCHAR(20)

DATA_LOAD_START_TIME: TIMESTAMP

DATA_LOAD_END_TIME: TIMESTAMP

PROCESS_TYPE: NVARCHAR(255)

CURRENT_START_TIME: TIMESTAMP

TOTAL_ITEMS: BIGINT

PROCESSED_ITEMS: BIGINT

500

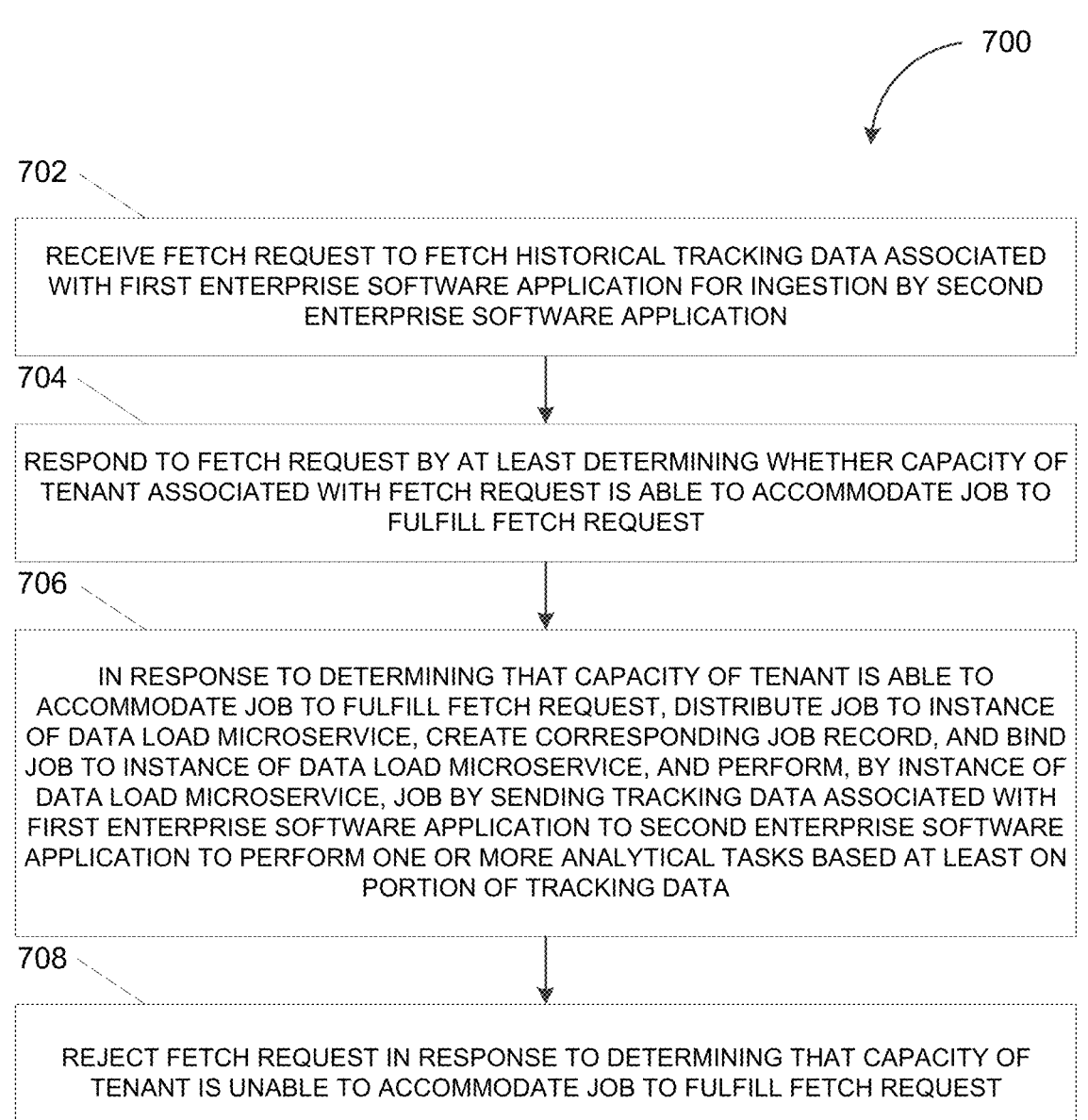

702 — RECEIVE FETCH REQUEST TO FETCH HISTORICAL TRACKING DATA ASSOCIATED WITH FIRST ENTERPRISE SOFTWARE APPLICATION FOR INGESTION BY SECOND ENTERPRISE SOFTWARE APPLICATION

704 — RESPOND TO FETCH REQUEST BY AT LEAST DETERMINING WHETHER CAPACITY OF TENANT ASSOCIATED WITH FETCH REQUEST IS ABLE TO ACCOMMODATE JOB TO FULFILL FETCH REQUEST

706 — IN RESPONSE TO DETERMINING THAT CAPACITY OF TENANT IS ABLE TO ACCOMMODATE JOB TO FULFILL FETCH REQUEST, DISTRIBUTE JOB TO INSTANCE OF DATA LOAD MICROSERVICE, CREATE CORRESPONDING JOB RECORD, AND BIND JOB TO INSTANCE OF DATA LOAD MICROSERVICE, AND PERFORM, BY INSTANCE OF DATA LOAD MICROSERVICE, JOB BY SENDING TRACKING DATA ASSOCIATED WITH FIRST ENTERPRISE SOFTWARE APPLICATION TO SECOND ENTERPRISE SOFTWARE APPLICATION TO PERFORM ONE OR MORE ANALYTICAL TASKS BASED AT LEAST ON PORTION OF TRACKING DATA

708 — REJECT FETCH REQUEST IN RESPONSE TO DETERMINING THAT CAPACITY OF TENANT IS UNABLE TO ACCOMMODATE JOB TO FULFILL FETCH REQUEST

FIG. 7

INTEGRATION OF ENTERPRISE SOFTWARE APPLICATIONS TO SUPPORT LOGISTICAL ANALYSIS

TECHNICAL FIELD

The subject matter described herein relates generally to enterprise software applications and more specifically to integration of logistical enterprise software applications.

BACKGROUND

An enterprise may rely on a suite of enterprise software applications for sourcing, procurement, supply chain management, invoicing, and payment. The operations of the enterprise may also give rise to a variety of electronic documents including, for example, purchase orders, sales contracts, licensing agreements, and/or the like. As such, the enterprise software applications may integrate various electronic document management features. For example, an electronic document may include structured data, which may be stored in a data repository such as a relational database, a graph database, an in-memory database, a non-SQL (NoSQL) database, a key-value store, a document store, and/or the like. The enterprise software applications may manage an electronic document throughout its lifecycle, including creation, compliance, execution, and archiving.

SUMMARY

Systems, methods, and articles of manufacture, including computer program products, are provided for integration of logistical enterprise software applications. In some example embodiments, there is provided a system that includes at least one processor and at least one memory. The at least one memory may include program code that provides operations when executed by the at least one processor. The operations may include: receiving a fetch request to fetch tracking data associated with a first enterprise software application, the tracking data being associated with a tracking model tracking a fulfilment cycle of each order item included in an order; in response to receiving the fetch request, determining whether a first capacity of a tenant associated with the fetch request is able to accommodate a first job fulfilling the fetch request; in response to determining that the first capacity of the tenant is able to accommodate the first job fulfilling the fetch request, distributing the first job to a first instance of a data load microservice selected based at least on a second capacity of the first instance of the data load microservice; and performing, by the first instance of the data load microservice, the first job including by sending the tracking data associated with the first enterprise software application to a second enterprise software application to perform one or more analytical tasks based on at least a portion of the tracking data.

In another aspect, there is provided a method for data model driven impact analysis of logistic exceptions. The method may include: receiving a fetch request to fetch tracking data associated with a first enterprise software application, the tracking data being associated with a tracking model tracking a fulfilment cycle of each order item included in an order; in response to receiving the fetch request, determining whether a first capacity of a tenant associated with the fetch request is able to accommodate a first job fulfilling the fetch request; in response to determining that the first capacity of the tenant is able to accommodate the first job fulfilling the fetch request, distributing the first job to a first instance of a data load microservice selected based at least on a second capacity of the first instance of the data load microservice; and performing, by the first instance of the data load microservice, the first job including by sending the tracking data associated with the first enterprise software application to a second enterprise software application to perform one or more analytical tasks based on at least a portion of the tracking data.

In another aspect, there is provided a computer program product including a non-transitory computer readable medium storing instructions. The instructions may cause operations may executed by at least one data processor. The operations may include: receiving a fetch request to fetch tracking data associated with a first enterprise software application, the tracking data being associated with a tracking model tracking a fulfilment cycle of each order item included in an order; in response to receiving the fetch request, determining whether a first capacity of a tenant associated with the fetch request is able to accommodate a first job fulfilling the fetch request; in response to determining that the first capacity of the tenant is able to accommodate the first job fulfilling the fetch request, distributing the first job to a first instance of a data load microservice selected based at least on a second capacity of the first instance of the data load microservice; and performing, by the first instance of the data load microservice, the first job including by sending the tracking data associated with the first enterprise software application to a second enterprise software application to perform one or more analytical tasks based on at least a portion of the tracking data.

In some variations of the methods, systems, and non-transitory computer readable media, one or more of the following features can optionally be included in any feasible combination.

In some variations, the first capacity of the tenant comprises a remaining job creation capacity of the tenant determined based at least on a total job creation capacity of the tenant, and wherein the tenant is determined to have sufficient capacity for the first job fulfilling the fetch request based at least on a third capacity required by the first job not exceeding the remaining job creation capacity of the tenant.

In some variations, the first instance of the data load microservice may be selected based at least on the second capacity of the first instance of the data load microservice. Upon selecting the first instance of the data load microservice, a job record corresponding to the first job may be created and the first job may be bound to the first instance of the data load microservice.

In some variations, the first instance of the data load microservice may be selected based at least on (i) the second capacity of the first instance of the data load microservice satisfying one or more thresholds or (ii) the first instance of the data load microservice having a highest capacity of a plurality of instances of the data load microservice.

In some variations, the first instance of the data load microservice may include a background job that detects when the first job is distributed to the first instance of the data load microservice. The background job may respond to the first job being distributed to the first instance of the data load microservice by at least allocating one or more threads to process the first job and monitoring a status of the first job.

In some variations, the background job may be associated with a management thread that manages the background job. The one or more threads allocated by the background job may include a job thread that manages the first job and one or more worker threads that fetch the tracking data from the first enterprise software application.

In some variations, the performing of the first job may include generating one or more payloads comprising the tracking data associated with the first enterprise software application before sending the one or more payloads of the tracking data to the second enterprise software application via an event stream processor.

In some variations, the fetch request may specify a first time period defined by a start timestamp and an end timestamp. The tracking data fetched from the first enterprise software application may include a first historical tracking data from the first specified time period.

In some variations, the fetch request may further specify a second time period. The response to receiving the fetch request may further include determining that the first capacity of the tenant is sufficient to accommodate a second job fetching a second historical tracking data from the second specified time period and distributing the second job to a second instance of the data load microservice selected based at least on a third capacity of the second instance of the data load microservice.

In some variations, the first enterprise software application includes a tracking engine that may at least: generate the tracking model to include a plurality of interconnected tracking objects that includes a first tracking object corresponding to the order, a second tracking object corresponding to an order item included in the order, a third tracking object corresponding to a delivery order item corresponding to the order item, a fourth tracking object corresponding to a first delivery order including the delivery order item, and a fifth tracking object corresponding to a transport event including the delivery order; detect, based at least on an inspection of one or more of the plurality of interconnected tracking objects comprising the tracking model, an occurrence of a logistic exception associated with the first delivery order, the logistic exception being detected based at least on at least one of (i) a delay event associated with the first delivery order and/or the transport event, (ii) a time of an arrival event associated with the first delivery order and/or the transport event, and (iii) a failure to receive the arrival event associated with the first delivery order and/or the transport event; determine an impact of the logistic exception associated with the first delivery order by at least determining, based at least on the tracking model, whether the logistic exception associated with the first delivery order impacts the transport event, the impact of the logistic exception being determined by at least identifying, based at least on an identifier of the order associated with the first delivery order, the tracking model, traversing the plurality of interconnected tracking objects comprising the tracking model to determine, based at least on an edge interconnecting the fourth tracking object representative of the first delivery order and the fifth tracking object representative of the transport event, that the first delivery order is a part of the transport event, and determining, based at least on a value of one or more data fields included in the fifth tracking object, whether the logistic exception associated with the first delivery order impacts the transport event; and update, based at least on the impact of the logistic exception, one or more of the plurality of interconnected tracking objects comprising the tracking model.

In some variations, the tracking engine may at least: in response to determining that the logistic exception impacts the transport event, update, based at least on the logistic exception, each of the first tracking object corresponding to the order, the second tracking object corresponding to the order item included in the order, the third tracking object corresponding to the delivery order item corresponding to the order item, the fourth tracking object corresponding to the first delivery order including the delivery order item, and the fifth tracking object corresponding to a transport event including the delivery order.

In some variations, in response to determining that the first capacity of the tenant is unable to accommodate the first job fulfilling the fetch request, the fetch request may be rejected by at least returning an error message to a client device associated with the fetch request.

In some variations, in response to determining that the second capacity of the first instance of the data load microservice is unable to accommodate the first job fulfilling the fetch request, the fetch request may be rejected by at least returning an error message to a client device associated with the fetch request.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes with respect to the integration of logistical enterprise software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts a flowchart illustrating an example of a process for integrating a first enterprise software application and a second enterprise software application, in accordance with some example embodiments;

When practical, similar reference numbers denote similar structures, features, or elements.

DETAILED DESCRIPTION

Figure 1:
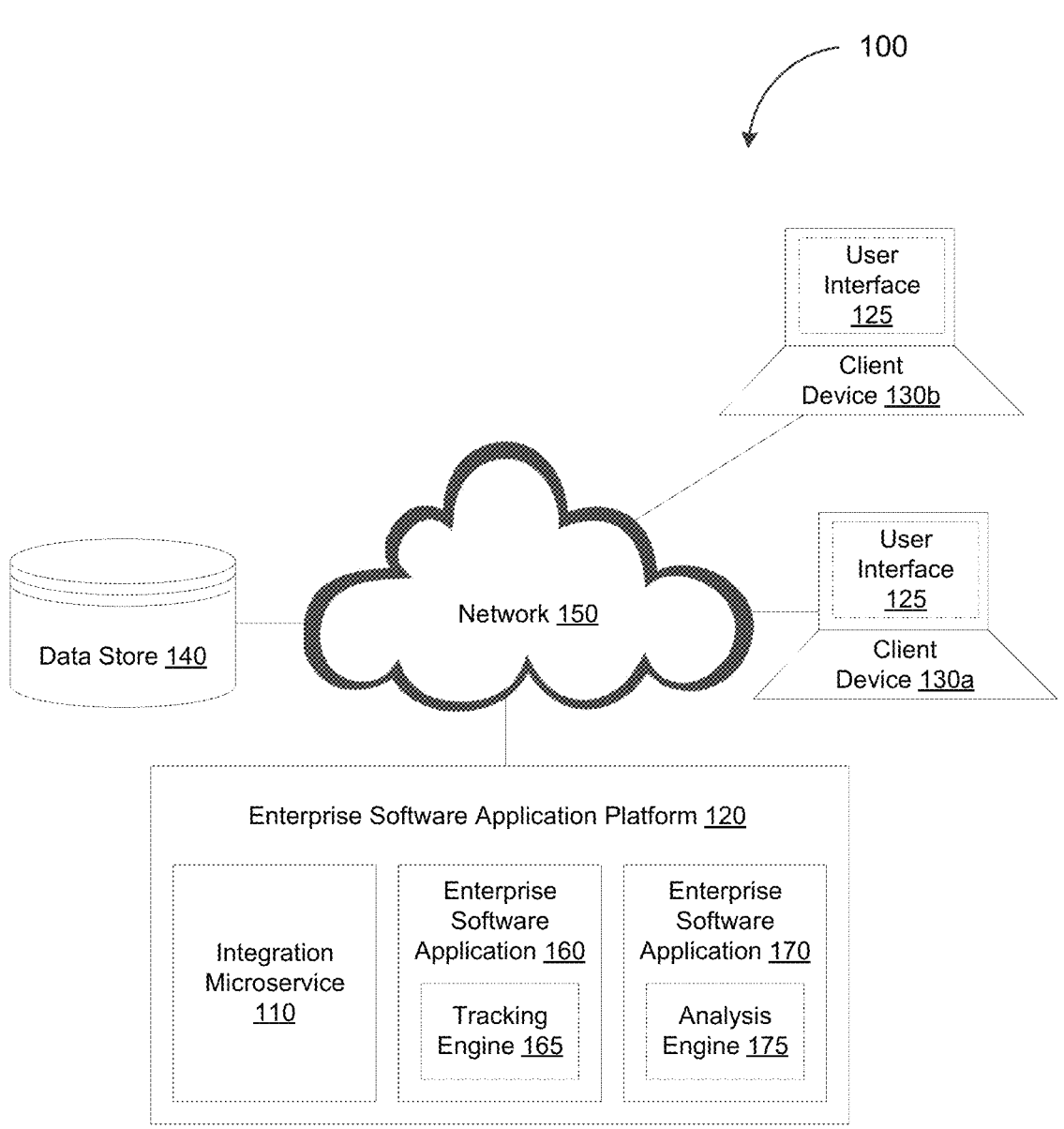
FIG. 1 depicts a system diagram illustrating an example of an enterprise software system, in accordance with some example embodiments.

Enterprise software applications may provide a variety of procurement and supply chain management solutions while integrating document management features for the electronic documents (e.g., purchase orders, sales contracts, licensing agreements, and/or the like) that may arise as a part of the process. For example, a first enterprise software application may include a tracking engine that may track the fulfilment cycle of each item in an order based on a corresponding tracking model including one or more interconnected tracking objects in a database. Meanwhile, a second enterprise software application may support a variety of data processing and analysis tasks operating on tracking data associated with the first enterprise software application. Integrating the first enterprise software application and the second enterprise software application may include configuring the second enterprise software application to ingest real time tracking data generated by the first enterprise software application. Furthermore, integrating the first enterprise software application and the second enterprise software application may include the second enterprise software application ingesting historical tracking data associated with the first enterprise software application. The ingestion of data, particularly large volumes of historical data, may be especially problematic in a multitenant cloud-based deployment where the fetching of tracking data associated with the first enterprise software application requires isolation of tenant-specific tracking data as well as compliance with various tenant-specific configurations for resource availability, transfer rate, and fault handling.

In some example embodiments, an integration microservice may respond to a fetch request from a tenant of the first enterprise software application and the second enterprise software application to fetch data associated with the first enterprise software application for ingestion by the second enterprise software application. In some cases, the fetch request may specify a time period (e.g., a time range defined by a start timestamp and an end timestamp) such that the data fetched from the first enterprise software application includes data from the specified time period. Upon receiving the fetch request, the integration microservice may determine whether the tenant's currently available computing resources are able to support the addition of a new job to fetch data associated with the first enterprise software application. Where the tenant's currently available computing resources are able to accommodate the addition of the new job to fetch data associated with the first enterprise software application, the integration microservice may identify, based at least on the capacity of the available instances of a data load microservice, a data load instance to distribute the job to fetch data associated with the first enterprise software application. In some cases, the integration microservice may further determine the quantity of threads required to process the job at the data load instance. In the event no data load instance has sufficient capacity to support the job to fetch data associated with the first enterprise software application, the integration microservice may reject the fetch request. Otherwise, the integration microservice may distribute the job to the data load instance identified as having the capacity to process the job to fetch data associated with the first enterprise software application. In instances where multiple data load instances have sufficient capacity to process the job to fetch data associated with the first enterprise software application, the integration microservice may distribute the job to the data load instance having a higher capacity.

FIG. 1 depicts a system diagram illustrating an example of an enterprise software system 100, in accordance with some example embodiments. Referring to FIG. 1, the enterprise software system 100 may include an enterprise software application platform 120, one or more client devices 130, and one or more data stores 140. The enterprise software application platform 120, the one or more client devices 130, and the one or more data stores 140 may be communicatively coupled via a network 150. The one or more client devices 130 may be a processor-based device including, for example, a smartphone, a tablet computer, a wearable apparatus, a virtual assistant, an Internet-of-Things (IoT) appliance, and/or the like. The one or more data stores 140 may include, for example, a relational database, a non-structured query language (NoSQL) database, an in-memory database, a graph database, a key-value store, a document store, and/or the like. The network 150 may be any wired network and/or a wireless network including, for example, a wide area network (WAN), a local area network (LAN), a virtual local area network (VLAN), a public land mobile network (PLMN), the Internet, and/or the like.

Referring again to FIG. 1, the enterprise software platform 120 may host a variety of microservices including, for example, an integration microservice 110, a first enterprise software application 160, and a second enterprise software application 170. In some example embodiments, the integration microservice 110 may support the transfer of data from the first enterprise software application 160 to the second enterprise software application 170. In some cases, the first enterprise software application 160 and the second enterprise software application 170 may provide a variety of logistical solutions. For example, in some cases, the first enterprise software application 160 may include a tracking engine 165 that may track the fulfilment cycle of each item in an order (e.g., a purchase order, a sales order, and/or the like) between a purchaser and a supplier. As shown in FIG. 1, the order may be generated at a first client device 130*a* associated with the purchaser. Moreover, the order may include one or more items, each of which being shipped in a corresponding delivery order generated at a second client device 130*b* associated with the supplier.

In some cases, an item in the order may be delivered in one or multiple transport events, each of which having at least one stage of delivery corresponding to a delivery order. A multistage transport event in this context may thus refer to a transport event that is associated with multiple delivery orders, each of which corresponding to one stage of delivery. During each stage of the multistage transport event, the item may be traveling to an intermediate location or its final destination. A logistic exception, such as a delay, associated with one stage of the multistage transport event may or may not impact the timeliness of subsequent stages of the transport event. Thus, in some example embodiments, the tracking engine 165 associated with the first enterprise software application 160 may track the fulfilment cycle of each item in the order including by determining whether the overall timeliness of any multistage transport event included in the order is impacted by a delay during one or more constituent stages. Meanwhile, the analysis engine 175 associated with the second enterprise software application 170 may ingest such tracking data associated with the first enterprise software application 160 and perform a variety of analytical tasks. For example, in some cases, the analysis engine 175 may analyze at least a portion of the tracking data associated with the first enterprise software application 160 to determine various performance metrics such as the quantity of on time and delayed transport events associated with individual suppliers, detect changes in the timeliness of transport events associated with different suppliers, and/or the like.

Figure 8A:
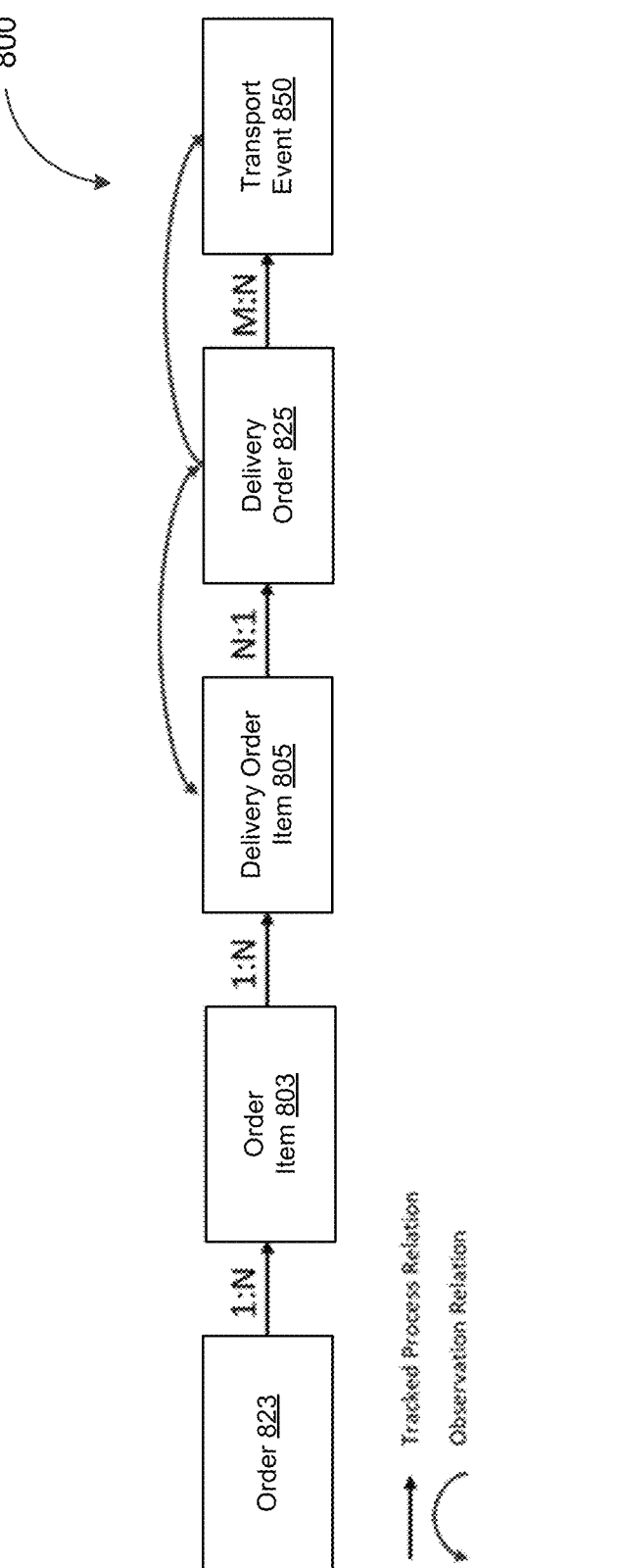
FIG. 8A depicts a block diagram illustrating an example of a tracking model, in accordance with some example embodiments.

In some cases, the tracking data from the first enterprise software application 160 may be associated with a tracking model. FIG. 8A depicts a block diagram illustrating an example of a tracking model 800, in accordance with some example embodiments. In some example embodiments, the tracking model 800 may articulate a mapping between the tracking objects associated with the fulfilment lifecycle of various item included in an order 823. The tracking engine 165 may therefore use the tracking model 800 to perform an impact analysis and determine, for example, whether a logistic exception during one stage of the multistage transport event impacts the overall timeliness of the transport event 850. Moreover, the tracking engine 165 may use the tracking model 800 in order to propagate a delay event to the relevant tracking objects.

As shown in FIG. 8A, in response to the generation of the order 823 at the first client device 120*a*, the tracking engine 165 may generate and maintain a first tracking object corresponding to the order 823 at the one or more data stores 140. Moreover, a second tracking object corresponding to each of an N quantity of order items 803 included in the order 823 may also be generated and maintained at the one or more data stores 140. In some cases, one or more order items 803 may map to a single delivery order item. This relationship is shown in FIG. 8A where an N quantity of delivery order items 805, each of which corresponding to one of the order items 803, may map to the one or more delivery orders 825. Moreover, FIG. 8A shows that an M quantity of the delivery orders 825 may map to an N quantity of the transport events 850. Accordingly, when the one or more delivery order 825 including the N quantity of delivery order items 805 is generated at the second client device 130*b*, a third tracking object corresponding to the delivery order 825, a fourth tracking object corresponding to each of the delivery order items 805, and a fifth tracking object corresponding to each of the transport events 850 may be generated and maintained at the one or more data stores 140. The fourth tracking object corresponding to the delivery order item 805 may be linked to the second tracking object associated with the corresponding order item 803. Furthermore, the fourth tracking object corresponding to the delivery order item 805 may be linked to the third tracking object associated with the corresponding delivery order 825, which may be in turned linked to the fifth tracking object corresponding to the transport event 850.

Figure 8B:
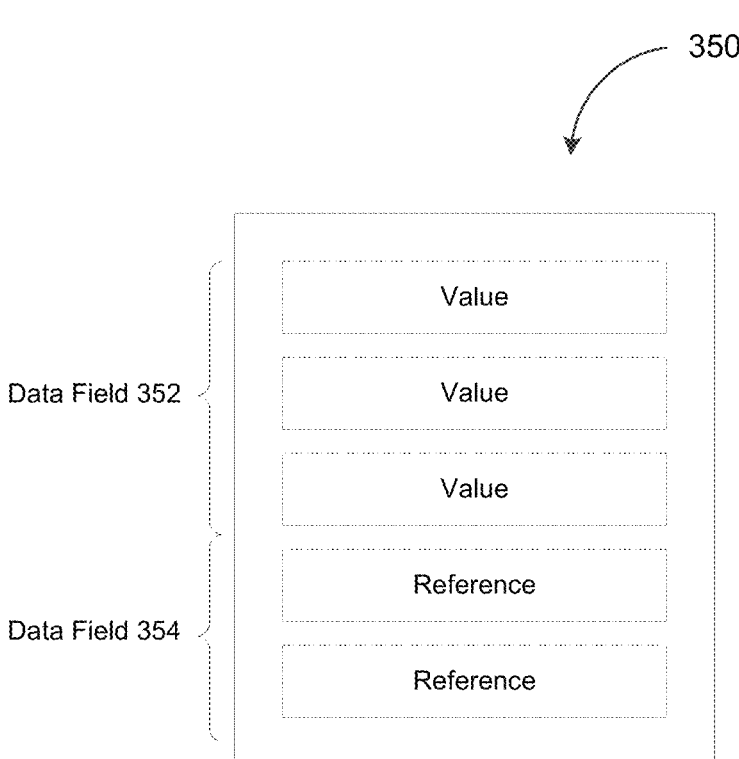
FIG. 8B depicts a schematic diagram illustrating an example of a tracking object, in accordance with some example embodiments.

FIG. 8B depicts a schematic diagram illustrating an example of a tracking object 350, in accordance with some example embodiments. In some example embodiments, the tracking object 350 may implement one or more of the first tracking object corresponding to the order 823, the second data corresponding to each of an N quantity of order items 803 included in the order 823, the third tracking object corresponding to the delivery order 825, the fourth tracking object corresponding to each of the delivery order items 805, and the fifth tracking object corresponding to each of the transport events 850. In some cases, the tracking object 350 may be a data structure (e.g., a table) or an entry (e.g., a row or a record) within the data structure holding data values and/or references to other tracking objects. Accordingly, in the example shown in FIG. 8B, the tracking object 350 may include one or more data fields 352 occupied by values indicating, for instance, an identifier, a description, a type, a status, a location, an expected delivery time, and/or the like. Furthermore, in the example shown in FIG. 8B, the tracking object 350 may include one or more data fields 354 occupied by references to other tracking objects. For example, where the tracking object 350 corresponds to the delivery order item 805, the one or more data fields 354 may include an identifier of the corresponding order item 803, an identifier of the order 823 containing the order item 803, an identifier of the delivery order 825 containing the delivery order item 805, and/or an identifier of the transport event 850 associated with the delivery order 825.

As noted, the tracking model 800 may be used by the tracking engine 165 in order to perform an impact analysis and determine, for example, whether a logistic exception during one stage of the multistage transport event 850 impacts the overall timeliness of the transport event 850. For example, the tracking engine 165 may identify, based at least on the tracking model 800, the one or more delivery orders 825 forming the transport event 850. Accordingly, the tracking engine 165 may determine, based at least on the tracking objects associated with each of the one or more delivery orders 825, and the transport event 850, whether the delay associated with one of the delivery orders 825 impacts the timeliness of another one of the delivery orders 825 and the transport event 850. For instance, where the data values associated with these tracking objects indicate that the other one of the delivery orders 825 may still arrive at the final destination (e.g., Location C) on time if the other one of the delivery orders 825 is still able to depart the intermediate location (e.g., Location B) on time or spends less than in transit than expected, the tracking engine 165 may determine, at least temporarily, that the delay of the first one of the delivery orders 825 does not impact the timeliness of the other one of the delivery orders 825 and the transport event 850 as a whole. Contrastingly, where the first one of the delivery orders 825 arrived at the intermediate location (e.g., Location B) after the departure time of the other one of the delivery orders 825 and the other one of the delivery orders 825 cannot arrive at the final destination (e.g., Location C) on time even with a minimum transit time, the tracking engine 165 may determine that the delay of the first one of the delivery orders 825 does impact the timeliness of the other one of the delivery orders 825 and/or that of the transport event 850 as a whole.

Figure 8C:
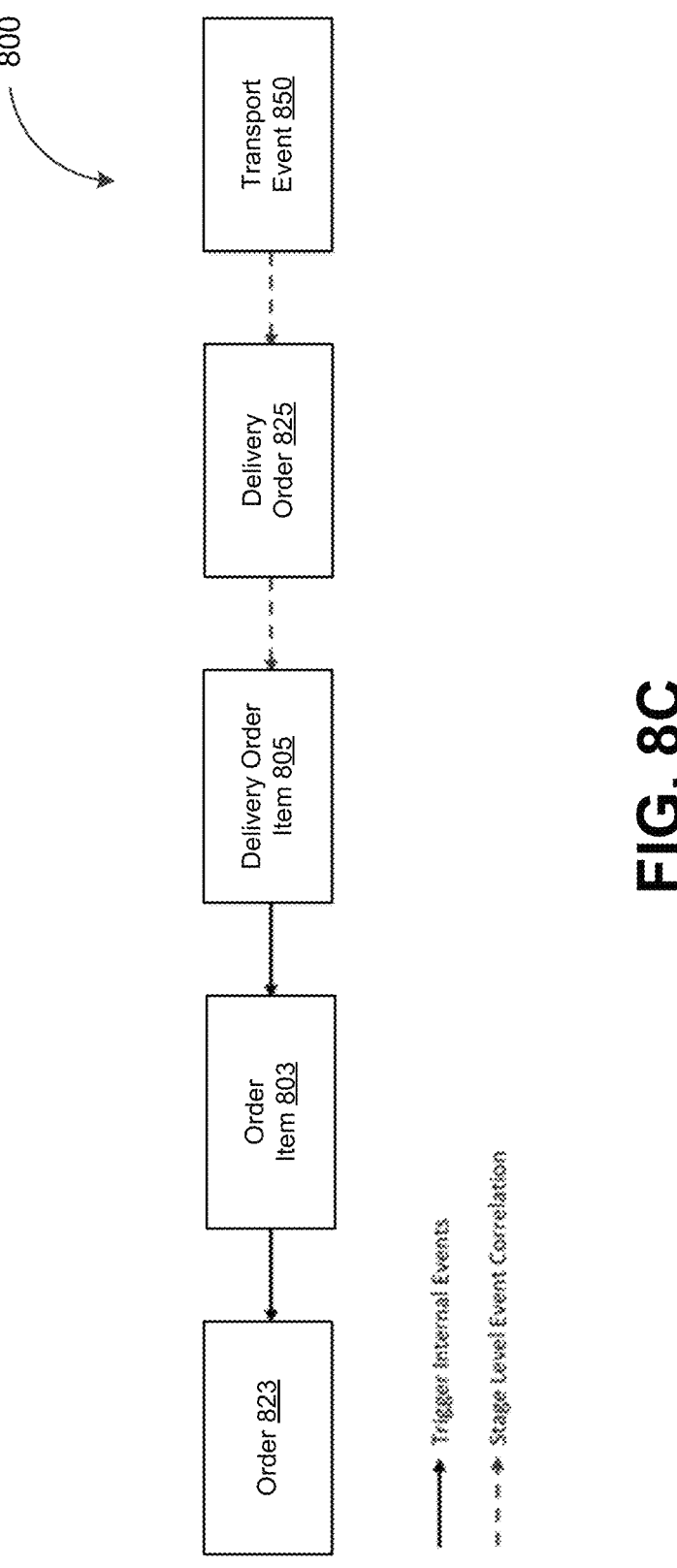
FIG. 8C depicts a block diagram illustrating an example of information propagation within a tracking model, in accordance with some example embodiments.

In the event the tracking engine 165 determines that the logistic exception (e.g., delay) associated with the first one of the delivery orders 825 does impact the timeliness of the other one of the delivery orders 825 and/or the transport event 850 as a whole, the tracking engine 165 may propagate this delay event to one or more relevant tracking objects indicated by the tracking model 800. For example, FIG. 8C shows that delay event may be propagated to the tracking objects corresponding to the other one of the delivery orders 825 and the transport event 850 as well as the tracking objects representative of the corresponding delivery order items 805, order items 803, and the order 823 itself. In some cases, the propagation of the delay event may include the tracking engine 165 accessing the relevant tracking objects to update the values of one or more relevant data fields. For instance, the delivery status and expected delivery time may be propagated to the tracking objects corresponding to the delivery order items 805. In the case of the order 823, the propagation of the delay event may include accessing the tracking objects of the order items 803 affected by the logistic exception while those not affected by the logistic exception are left unaltered. Accordingly, in the example shown in FIGS. 8A-C, the tracking engine 165 may access the second tracking object associated with the impacted order item 803 to update, for example, the delivery status and expected delivery time of the order item 803.

In some example embodiments, the integration microservice 110 may orchestrate the integration of the first enterprise software application 160 and the second enterprise software application 170. For example, in some cases, integrating the first enterprise software application 160 and the second enterprise software application 170 may include the integration microservice 110 orchestrating the second enterprise software application 170 ingesting tracking data, including historical tracking data, from the first enterprise software application 160. In some cases, the tracking data ingested from the first enterprise software application 160 may be associated with a tracking model, such as the example of the tracking model 800 shown in FIGS. 8A-C.

Figure 2:
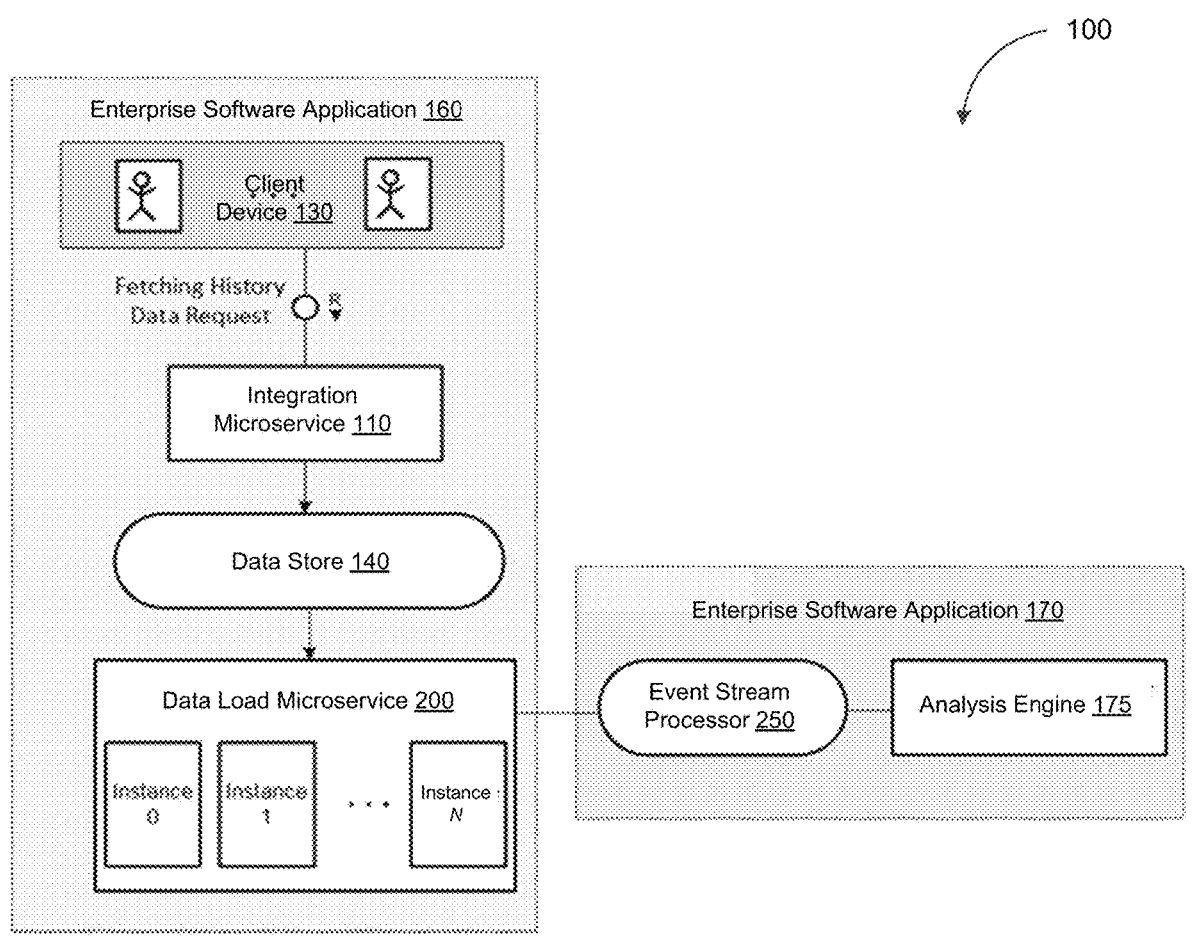
FIG. 2 depicts a schematic diagram illustrating an example of an outbound scenario, in accordance with some example embodiments.

FIG. 2 depicts a block diagram illustrating an example of a dataflow within the enterprise software system 100, in accordance with some example embodiments. Referring to FIGS. 1-2, the integration microservice 110 may receive, from the one or more client devices 130, a fetch request to fetch, from the first enterprise software application 160, historical tracking data. In some cases, the fetch request may specify a process type as well as a time range for the tracking data to be fetched from the one or more data store 140 associated with the first enterprise software application 160. For instance, in some cases, the time range for the tracking data may be defined by a first timestamp specifying a start of the time range and a second timestamp specifying an end of the time range.

Table 1 below depicts an example of an application programming interface (API) call to fetch data associated with the first enterprise software application 160.

TABLE 1

```
Method: Post(Create a job task)
Path: /data-load/jobs
[
    {
        "processType":
        "com.gttsampleso01.gtt.app.sofvpauto.Shipment.Shipment",
        "startTime": "2021-09-17103:23:00Z", //include this timestamp
        "endTime": "2021-09-30T03:23:00Z" //include this timestamp
    },
    {
    ...
    }
]
```

Table 2 depicts an example of a response to a fetch request to fetch historical tracking data associated with the first enterprise software application 160.

TABLE 2

```
201 Created
[
    {
        "jobid": "e3068d54-90c7-4012-82c8-a7e08a02590a", //Use this id to
        get job status, cancel the job.
        "location":
        "/sap/logistics/gtt/integration/ii/v1/data-load/jobs/e3068d54-90c7-
        4012-82c8-a7e08a02590a",
        "processType":
        "com.gttsampleso01.gtt.app.sofvpauto.Shipment.Shipment",
        "startTime": 1631848980000, // >= startTime
        "endTime": 1632972180000 // <= endTime
    },
    {
    ...
    }
]
// timestamp format: number of milliseconds from the epoch of
1970-01-01T00:00:00Z
400 Bad Request for validation failed
{
    "error": {
        "code":
        "com.sap.gtt.v2.exception.DataFetchJobCreationException.XXXX",
        "message": "Request contains duplicate process type. Correct the
        payload and try again",
        "details": [ ]
    }
}
```

Referring again to FIG. 2, in response to receiving the fetch request from the one or more client devices 130, the integration microservice 110 may determine the quantity of jobs (e.g., fetch jobs) capable of being supported by the computational resources of the tenant associated with the fetch request. In the event the addition of a new job (e.g., to fetch historical data associated with the first enterprise software application 160) exceeds the computational resource limitations of the tenant, the integration microservice 110 may reject the fetch request. It should be appreciated that these computational resource limitations may be defined by one or more tenant level configurations. If the computational resources of the tenant is capable of accommodating the new job (e.g., to fetch historical data associated with the first enterprise software application 160), the integration microservice 110 may distribute the job to an instance of a data load microservice 200. For example, in some cases, the integration microservice 110 may select, based at least on a respective capacity of each instance of the data load microservice 200, one of the N available instances of the data load microservice 200 to process the job.

In some cases, the integration microservice 110 may select the one of the N available instances of the data load microservice 200 having a highest capacity and/or whose capacity satisfies one or more thresholds. Once the job is distributed to a particular instance of the data load microservice 200, the integration microservice 110 may log an identifier of the instance (e.g., an instance index) in a record associated with the job. The selected instance of the data load microservice 200 may create one or more threads for processing the job to fetch historical tracking data associated with the first enterprise software application 160. In some cases, each instance of the data load microservice 200 may execute a background job that checks, at fixed intervals, for example, for jobs distributed to the instance of the data load microservice. For example, when the background job detects a new job in a job table, the background job may allocate one or more threads to process the job and monitoring the progress and status of the job. In some cases, as a part of monitoring job progress and status, the background job may detect exceptions and restart a thread in cases where a thread dies due to the occurrence of an exception. Accordingly, if Instance 0 of the data load microservice 200 is selected to process the job to fetch historical tracking data associated with the first enterprise software application 160, a background job at Instance 0 of the data load microservice may detect the job, allocate one or more threads to process the job, and track the progress of the job. In the example shown in FIG. 2, the second enterprise software application 170 may include an event stream processor 250 for handling the incoming historical tracking data being sent from the first enterprise software application 160 by the one or more threads of the selected instance of the data load microservice 200.

Figure 3:
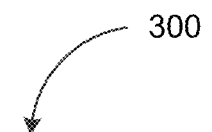
FIG. 3 depicts a schematic diagram illustrating an example of a job record, in accordance with some example embodiments.

FIG. 3 depicts a schematic diagram illustrating an example of a job record 300 created by the integration microservice 110 upon selecting one of the N available instances of the data load microservice 200 to which to distribute the job to fetch historical tracking data associated with the first enterprise software application 160. In some cases, the job record 300 may be stored as a part of a job table created and stored, for example, at the one or more data stores 140. Referring to FIG. 3, the field PROCESSOR_OR-DINAL may be associated with a value indicative of which instance of the data load microservice 200 is processing the job associated with the job record 300. The field RESOURCE_LEVEL may be associated with a value indicative of current customer resource level, which may be duplicated from the tenant setting table as a numeric value instead of a string in order to enable the computation of instance capacity and to enable temporary modifications (e.g., to increase the rate of fetching data associated with the first enterprise software application 160). In some cases, FIG. 3 shows that the job record 300 may also include the field JOB_STATUS whose value may be indicative of the status of the current job.

Table 3 below depicts an example of a structured query language (SQL) statement for creating a job record table including, for example, the job record 300.

TABLE 3

```
CREATE COLUMN TABLE II_JOB_INFO
(
    ID NVARCHAR(36) PRIMARY KEY,
    PROCESSOR_ORDINAL INTEGER,
```

TABLE 3-continued

```
    ZONE_ID NVARCHAR(36),
    RESOURCE_LEVEL INTEGER,
    JOB_START_TIME TIMESTAMP,
    JOB_END_TIME TIMESTAMP,
    JOB_STATUS NVARCHAR(20),
    DATA_LOAD_START_TIME TIMESTAMP,
    DATA_LOAD_END_TIME TIMESTAMP,
    PROCESS_TYPE NVARCHAR(255) UNIQUE,
    CURRENT_START_TIME TIMESTAMP,
    TOTAL_ITEMS BIGINT,
    PROCESSED_ITEMS BIGINT
)
```

In some cases, in addition to job table, the integration microservice 110 may also generate and maintain a job information history table containing records of completed jobs and canceled jobs. The job information history table may be stored, for example, in the one or more data stores 140. Moreover, in some cases, the job information history table may include one or more of the same (or similar) fields as the job table (e.g., the job record 300).

Figure 4:
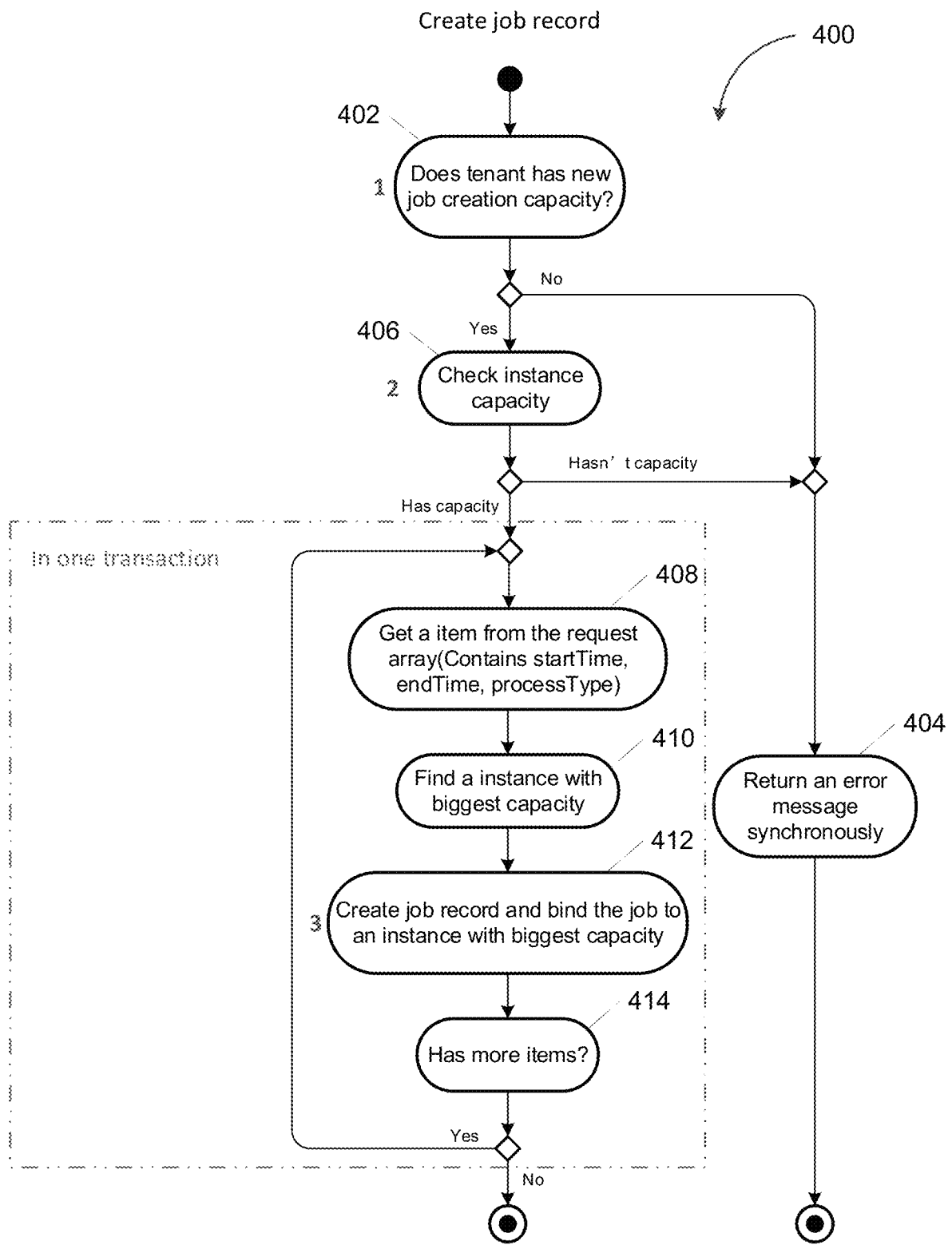
FIG. 4 depicts an activity diagram illustrating an example of a process for handling a fetch request to fetch data from an enterprise software application, in accordance with some example embodiments.

FIG. 4 depicts an activity diagram illustrating an example of a process 400 for handling a fetch request to fetch data from, for example, the first enterprise software application 160. Referring to FIG. 4, the integration microservice 110 may receive, from the one or more client devices 130a and/or 130b, a fetch request to fetch historical tracking data associated with the first enterprise software application 160 for ingestion by the second enterprise software application 170. At 402, the integration microservice 110 may respond to the fetch request by determining whether the tenant associated with the fetch request has new job creation capacity. In some cases, the integration microservice 110 may apply Equation (1) below to a total job creation capacity of the tenant.

$$job\_creation\_capacity = FLOOR(customer\_level \times \quad (1)$$
$$JOB\_CREATION\_CAPACITY\_COEFFICIENT)$$

Table 4 below depicts an example of a SQL statement for determining the current remaining capacity associated with the tenant.

TABLE 4

```
SELECT ?_1 - COUNT(*) CAPACITY
FROM II_JOB_INFO
WHERE ZONE_ID = ?_2
/*
    ?_1:  total capacity of the current customer
    ?_2:  current customer zone id
*/
```

In some cases, the integration microservice 110 may reject the fetch request if the remaining capacity of the tenant associated with the fetch request is less than the capacity required by the fetch request. Accordingly, in the event the tenant does not have new job creation capacity, at 404, the integration microservice 110 may return an error message, for example, synchronously to the one or more client devices 130. Where the integration microservice 110 determines that the tenant does have new job creation capacity, at 406, the integration microservice 110 may check the capacity of the one or more instances of the data load microservice 200. Table 5 below depicts an example of a SQL statement for determining the remaining capacity of individual instances of the data load microservice 200. If an instance of the data load microservice 200 already has jobs to run, the SQL statement shown in Table 5 may be executed in order to obtain the remaining capacity of the instance. Meanwhile, the capacity of idle instances of the data load microservice 200 may correspond to the value of that instance's worker thread limit. In some cases, the total quantity of idle instances of the data load microservice 200 may correspond to the difference between the total quantity of instances of the data load microservice 200 and the size of the result set from executing the SQL statement shown in Table 5. The overall remaining capacity may correspond include the capacity of the idle instances of the data load microservice 200.

TABLE 5

TOTAL_INSTANCES indicates: How many instances do data load microservice 200 have.
SELECT PROCESSOR_ORDINAL, ?_1 - SUM(RESOURCE_LEVEL)
* ?_2 CAPACITY FROM II_JOB_INFO
GROUP BY PROCESSOR_ORDINAL
HAVING PROCESSOR_ORDINAL < ?_3
ORDER BY CAPACITY DESC
/*
   ?_1:   quantity of worker thread that one instance can
   create(ONE_INSTANCE_WORKER_THREAD_LIMIT)
   ?_2:   THREAD_ALLOCATION_COEFFICIENT
   ?_3:   TOTAL_INSTANCES
Currently, the THREAD_ALLOCATION_COEFFICIENT is 1.
Currently, the ONE_INSTANCE_WORKER_THREAD_LIMIT is 20.
*/

Table 6 below depicts an example of the results associated with querying the capacity of individual instances of the data load microservice 200.

TABLE 6

| PROCESSOR_ORDINAL | CAPACITY (# OF THREADS) |
| --- | --- |
| 4 | 10 |
| 2 | 5 |
| 0 | 0 |
| 1 | −1 |

In some cases, the capacity of the tenant associated with the fetch request may be further determined based on the quantity of threads required for a single job. Equation (2) below may be applied to determine the quantity of threads required for a single job for the tenant associated with the fetch request. The thread capacity of the data load microservice 200 may then be converted to the quantity of jobs that may be created for the tenant.

$$total\_thread\_will\_create\_for\_one\_job = \qquad (2)$$
$$FLOOR(resource\_level \times THREAD\_ALLOCATION\_COEFFICIENT)$$

In the event none of the instances of the data load microservice 200 is determined to have capacity for the job to fetch historical tracking data associated with the first enterprise software application 160, the integration microservice 110 may again, at 404, return an error message synchronously to the one or more client devices 130*a* and/or 130*b*. In the event the integration microservice 110 determines that the one or more instances of the data load microservice 200 has the capacity to accommodate the job, the integration microservice 110 may, at 408, retrieve an item from the request array (e.g., array(contains startTime, endTime, processType)) before selecting one instance of the data load microservice 200 (e.g., the instance having an above-threshold capacity or the largest capacity) to which to distribute the job. For example, at 410, the integration microservice 110 may select the instance of the data load microservice 200 having the largest capacity to distribute the job. Moreover, at 412, the integration microservice 110 may create, for example, the job record 300, and bind the job to the selected instance of the data load microservice 200. At 414, the integration microservice 110 may determine whether the fetch request contains additional items. Should the fetch request contain additional items (e.g., a request for historical tracking data from a different processType), the integration microservice 110 may return to operation 408 and retrieve an item from the request array (e.g., array (contains startTime, endTime, processType)) before continuing at operation 410 where the integration microservice 110 identifies another instance of the data load microservice 200 to which to distribute the corresponding job.

In some example embodiments, upon creating the job record 300, the integration microservice 110 may also create a corresponding job status with one or more of the fields shown in Table 7 below.

TABLE 7

CURRENT_START_TIME: The start time should be used in current loop. Update this value in each loop. The initial value should as same as DATA_LOAD_START_TIME.
TOTAL _ITEMS: Estimate how many tracked processes should send to second enterprise software application 170. This value should generate during job record creation and won't update in the future. This value may inaccurate, because we can't prevent customer deleting tracked process during the job running.
PROCESSED_ITEMS: Indicate how many tracked process has sent currently. (Tracked process is a unit, including its related actual events). The initial value should be 0.
ID: Random UUID
ZONE ID: Current tenant's zone id As noted, in some cases, each instance of the data load microservice 200 may execute a background job that checks, at fixed intervals, for example, for jobs distributed to the instance of the data load microservice. Furthermore, when the background job detects a new job in a job table, the background job may allocate one or more threads to process the job while monitoring the progress and status of the job. The background job may be associated with one or more of the threads described in Table 8 below. To further illustrate, FIG. 5A depicts an activity diagram 500 illustrating various functionalities of an example of a management thread while FIG. 5B depicts an activity diagram 550 illustrating various functionalities of an example of a job thread.

Figure 5A:
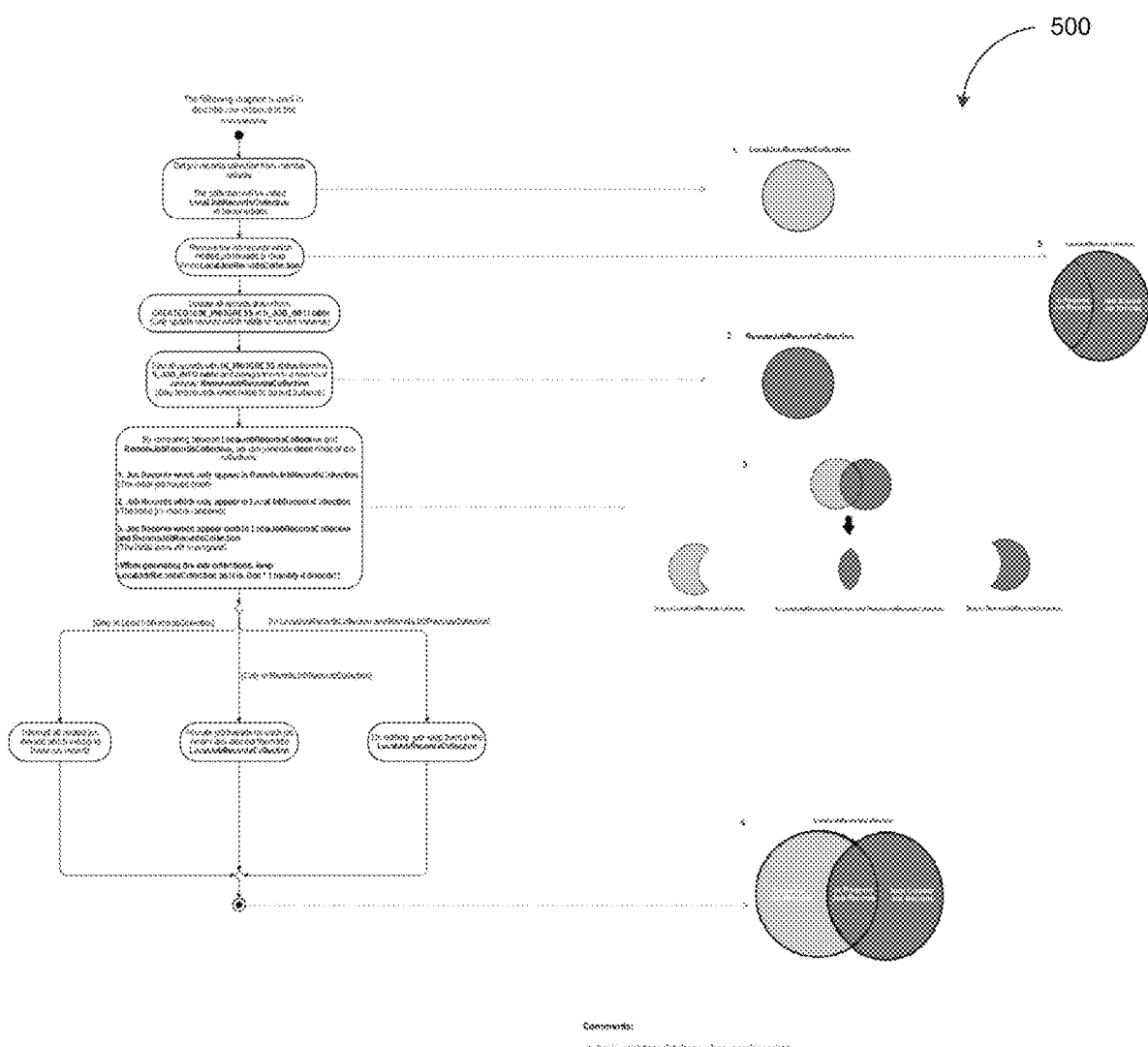
FIG. 5A depicts an activity diagram illustrating the various functionalities of an example of a management thread, in accordance with some example embodiments.

Referring to FIG. 5A, the management thread may obtain a local rob record collection from a member variable before removing job records associated with dead job threads. The management thread may also generate a remote job records collection, for example, by identifying job records whose status is in progress from the job information table (e.g., in the data store 140) related to the current instance of the data load microservice 120. The management thread may generate three sub-collections of job records by at least comparing the local job record collection and the remote job record collection. For example, the management thread may generate a first sub-collection of job records that appear only in the local job record collection, a second sub-collection of job records that appear only in the remote job record collection, and a third sub-collection of job records that appear in both the remote and local job record collection. As shown in FIG. 5A, the management thread may interrupt all related job threads belonging to the first sub-collection, allocate job threads for each job record in the second sub-collection and add those job records to the first sub-collection, and do nothing with the job records in the third sub-collection.

Figure 5B:
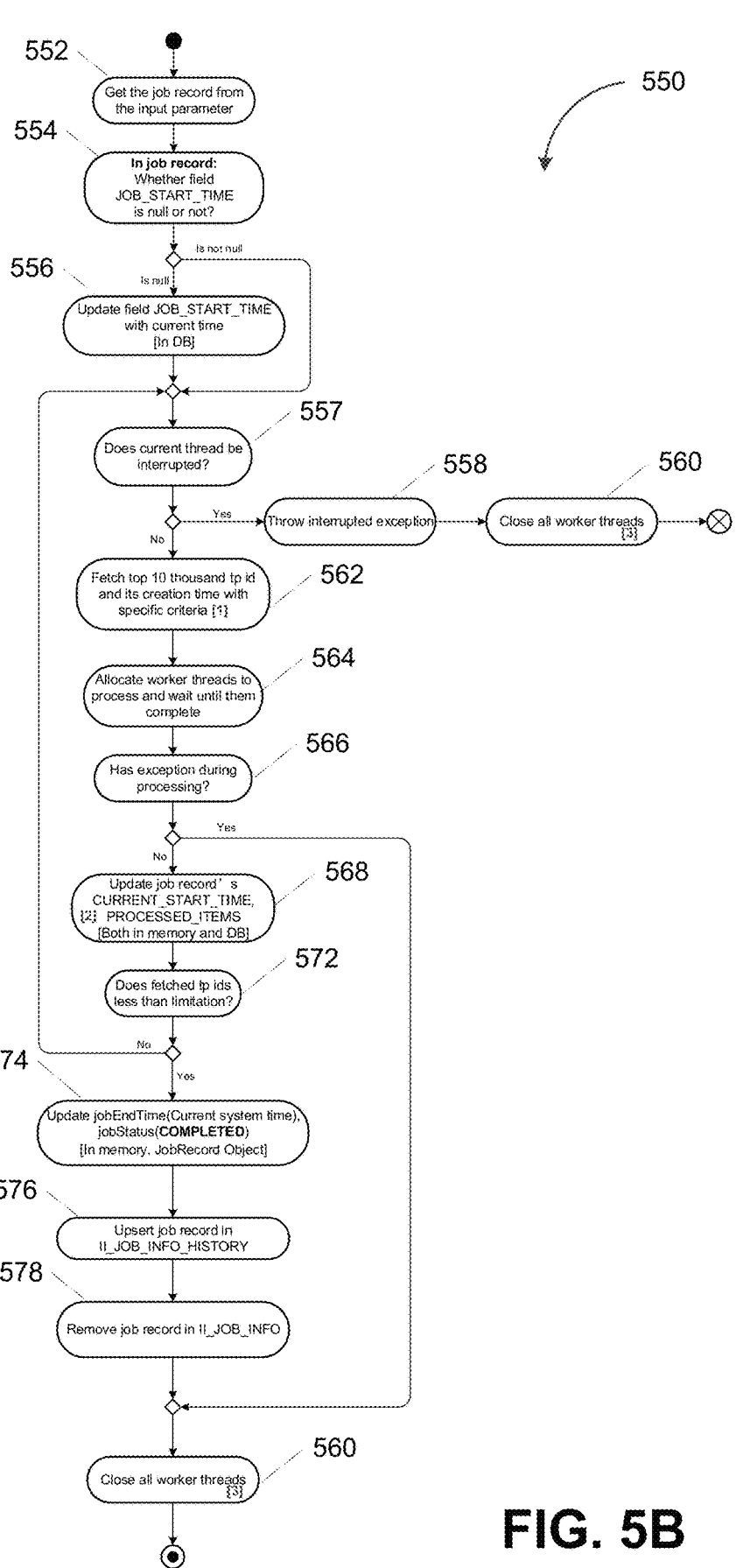
FIG. 5B depicts an activity diagram illustrating the various functionalities of an example of a job thread, in accordance with some example embodiments.

Referring to FIG. 5B, upon being created by a management thread, a job thread may, at 552, receive the job record 300 retrieved from the data store 140 by the management thread before determining, at 554, whether the job start time field in the job record 300 is null. In the event the job start time field in the job record 300 is null, the job thread may, at 556, update the job start time field of the job record 300 (e.g., in the data store 140) with the current time. Alternatively, if the job start time field in the job record 300 is not null, the job thread may, at 557, determine whether the job thread is being interrupted (e.g., by the management thread). In the event the job thread is being interrupted (e.g., by the management thread), the job thread may throw an interrupted exception at 558 before closing all worker threads allocated for the job at 560. If the job thread determines that the job thread is not being interrupted (e.g., by the management thread), the job thread may, at 562, fetch a certain quantity of tracked process identifiers of tracked processes whose creation time satisfy the criteria associated with the job (e.g., tracked processes created during a time range defined by a start timestamp and an end timestamp included in the fetch request).

At 564, the job thread may allocate one or more worker threads to process the tracked processes identifiers fetched at 562 including, for example, by fetching the tracked processes, planned events, and actual events, and generating corresponding payloads of tracking data for sending to the second enterprise software application 170 via the event stream processor 250. At 566, the job thread may determine whether any exceptions have occurred during the processing by the worker threads. If so, the job thread may return to operation 560 and close all worker threads. Alternatively, if no exceptions have occurred during the processing by the worker threads, the job thread may, at 568, update the job record 300 including, for example, the current start time field and processed items field of the job record 300 (e.g., in memory as well as in the data store 140). At 572, the job thread may determine whether the identifier of the fetched tracked processes exceed a threshold associated with the criteria of the job (e.g., tracked processes created during a time range defined by a start timestamp and an end timestamp included in the fetch request). If the identifier of the fetched tracked processes do not exceed the threshold, the job thread may continue at operation 557 where the job thread continue to monitor whether the job thread is being interrupted (e.g., by the management thread). Alternatively, if the identifier of the fetched tracked processes exceeds the threshold, the job thread may update the job record 300 including, for example, the job end time field (e.g., with the current time) and the job status field (e.g., to "COMPLETED"). At 576, the job thread may insert the job record 300 in the job information history table (e.g., in the data store 140) before removing, at 578, the job record 300 from the job information table (e.g., in the data store 140). Upon removing the job record 300, the job thread may, at 560, close all worker threads allocated for the job.

Figure 6:
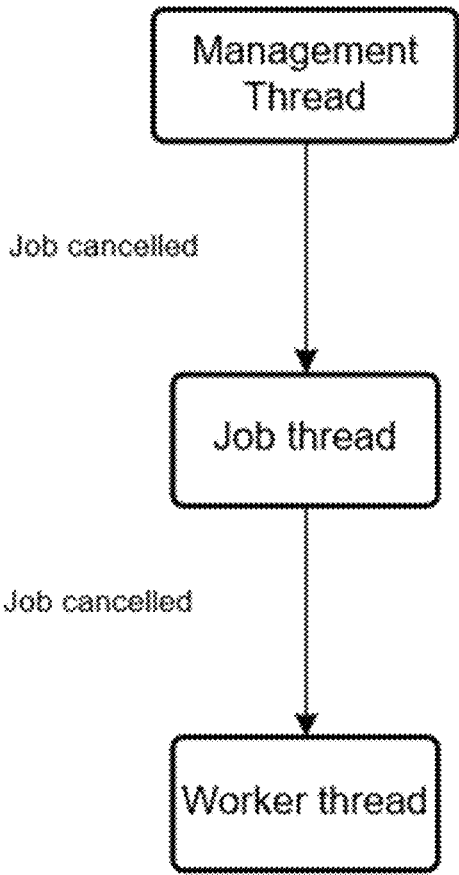
FIG. 6 depicts a schematic diagram illustrating an example of an interruption relationship amongst various threads of an instance of a data load microservice, in accordance with some example embodiments.

As shown in Table 8, the background job may be associated with a management thread for managing the entire background job, one or more job threads for managing each individual job, and one or more worker threads fetching the historical tracking data associated with the first enterprise software application 160 and populating an event stream (e.g., associated with the event stream processor 250) to deliver one or more payloads of the historical tracking data to the second enterprise software application 170 for ingestion and further analysis by the analysis engine 175. As shown in FIG. 6, in some cases, the management thread may cancel a job thread, and the job thread may then cancel a worker thread. In some cases, every job to fetch historical tracking data associated with the first enterprise software application 160 may be terminated by shutting down the integration microservice 110 while one or more specific jobs may be terminated by canceling the individual jobs.

TABLE 8

1. Management thread: This thread is used to manage the background job, which includes detecting the creation of new jobs and allocating threads to handle the new jobs. Furthermore, in the event an existing job is canceled, the management thread may interrupt the corresponding thread. The spring framework creates the management thread by at least adding a management task to the task scheduler provided by the spring framework.
2. Job thread: This thread is used to manage individual jobs, with each job record being bound to a single job thread. Job threads are created by the management thread. Moreover, the responsibility of a job thread includes (i) obtaining a collection of tracked process identifiers from the data store 140, (ii) distributing portions of the tracked process identifier collection amongst multiple worker threads, and (iii) updating save points and job record status.
3. Worker thread: Worker threads are created by job threads. The responsibility of a worker thread includes (i) fetching tracked processes, planned events, and actual events, (ii) generating initial payloads of tracking data, and (iii) sending payloads to event stream processor 250.

FIG. 7 depicts a flowchart illustrating an example of a process 700 for integrating a first enterprise software application and a second enterprise software application, in accordance with some example embodiments. Referring to FIGS. 1-7, the process 700 may be performed by the integration microservice 110 in order to integrate the first enterprise software application 160 and the second enterprise software application 170. In some cases, the first enterprise software application 160 and the second enterprise software application 170 may provide a variety of logistical solutions. For example, in some cases, the first enterprise software application 160 may include the tracking engine 165 that may track the fulfillment cycle of each item in an order between a purchase and a supplier, and the second enterprise software application 170 may include the analysis engine 175 that may perform a variety of analytical tasks on tracking data associated with the first enterprise software application 160.

At 702, the integration microservice 110 may receive a fetch request to fetch historical tracking data associated with the first enterprise software application 160 for ingestion by the second enterprise software application 170. For example, in some example embodiments, the integration microservice 110 may receive, from the one or more client devices 130*a* and/or 130*b*, a fetch request to fetch historical tracking data associated with the first enterprise software application 160 for ingestion by the second enterprise software application 170. In some cases, the fetch request may specify, for example, a process type as well as a time period (e.g., a time range defined by a start timestamp and an end timestamp) such that the tracking data fetched from the first enterprise software application 160 includes tracking data from the specified time period.

At 704, the integration microservice 110 may respond to the fetch request by determining whether a capacity of a tenant associated with the fetch request is able to accommodate a job to fulfill the fetch request. In some example embodiments, the integration microservice 110 may, upon receiving the fetch request, determine whether the tenant associated with the fetch request has sufficient new job creation capacity to support the job to fetch historical tracking data from the first enterprise software application 160. In some cases, the integration microservice 110 may determine, based at least on a total job creation capacity of the tenant, the current remaining capacity of the tenant. Whether the capacity of the tenant is able to accommodate the job to fetch historical tracking data from the first enterprise software application 160 may be determined based at least on the remaining capacity of the tenant and the capacity required by the fetch request.

At 706, in response to determining that the capacity of the tenant associated with the fetch request is able to accommodate the job to fulfill the fetch request, the integration microservice 110 may distribute the job to an instance of the data load microservice 200, create a corresponding job record, and bind the job to the instance of the data load microservice 200, and the instance of the data load microservice 200 may perform the job by at least sending tracking data associated with the first enterprise software application 160 to the second enterprise software application 170 to perform one or more analytical tasks to perform one or more analytical tasks based on at least a portion of the tracking data. In some example embodiments, the integration microservice 110 may determine that the current remaining capacity of the tenant is sufficient to accommodate the job to fetch historical tracking data from the first enterprise software application 160. In that case, the integration microservice 110 may select, for example, one of an N quantity of available instances of the data load microservice 200 to handle the job. In some cases, the integration microservice 110 may select the instance of the data load microservice 200 based at least on the available capacity at each instance of the data load microservices 200. For example, in some cases, the integration microservice 110 may select an instance of the data load microservice 200 whose capacity satisfies one or more thresholds and/or an instance of the data load microservice 200 having a largest available capacity. Upon selecting the instance of the data load microservice 200, the integration microservice 110 may generate a corresponding job record, such as the job record 300 and bind the job to fetch historical tracking data from the first enterprise software application 160 to the selected instance of the data load microservice 200. Upon selecting the instance of the data load microservice 200, the integration microservice 110 may, generate the corresponding job record, and store the job record in the data store 140. It should be appreciated that the integration microservice 115 performs thread calculation to determine capacity and not for thread allocation. Moreover, the integration microservice 115 does not communicate directly with the data load microservice 120 to distribute the job. Instead, a management thread in the selected instance of the data load microservice 200 may read the data store 140 (e.g., at fixed intervals) to retrieve the job record before creating a corresponding job thread for the job. That job thread is then responsible for allocating and managing the worker threads for the job. Meanwhile, each worker thread will be responsible for creating one or more corresponding payloads and delivering the one or more payloads of historical tracking data to the second enterprise software application 170 via the event stream processor 250.

At 708, the integration microservice 110 may reject the fetch request in response to determining that the capacity of the tenant is unable to accommodate the job to fulfill the fetch request. In some cases, where the current remaining capacity of the tenant is unable to accommodate the job to fetch historical tracking data from the first enterprise software application 160, the integration microservice 110 may reject the fetch request. For example, in some cases, the integration microservice 110 may reject the fetch request by at least synchronously returning an error message to the one or more client devices 130.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a fetch request to fetch tracking data associated with a first enterprise software application, the tracking data being associated with a tracking model tracking a fulfilment cycle of each order item included in an order; in response to receiving the fetch request, determining whether a first capacity of a tenant associated with the fetch request is able to accommodate a first job fulfilling the fetch request; in response to determining that the first capacity of the tenant is able to accommodate the first job fulfilling the fetch request, distributing the first job to a first instance of a data load microservice selected based at least on a second capacity of the first instance of the data load microservice; and performing, by the first instance of the data load microservice, the first job including by sending the tracking data associated with the first enterprise software application to a second enterprise software application to perform one or more analytical tasks based on at least a portion of the tracking data.

Example 2: The system of Example 1, wherein the first capacity of the tenant comprises a remaining job creation capacity of the tenant determined based at least on a total job creation capacity of the tenant, and wherein the tenant is determined to have sufficient capacity for the first job fulfilling the fetch request based at least on a third capacity required by the first job not exceeding the remaining job creation capacity of the tenant.

Example 3: The system of any of Examples 1 to 2, wherein the operations further comprise: selecting the first instance of the data load microservice based at least on the second capacity of the first instance of the data load microservice; and upon selecting the first instance of the data load microservice, creating a job record corresponding to the first job and binding the first job to the first instance of the data load microservice.

Example 4: The system of Example 3, wherein the first instance of the data load microservice is selected based at least on (i) the second capacity of the first instance of the data load microservice satisfying one or more thresholds or (ii) the first instance of the data load microservice having a highest capacity of a plurality of instances of the data load microservice.

Example 5: The system of any of Examples 3 to 4, wherein the first instance of the data load microservice includes a background job that detects when the first job is distributed to the first instance of the data load microservice, and wherein the background job responds to the first job being distributed to the first instance of the data load microservice by at least allocating one or more threads to process the first job and monitoring a status of the first job.

Example 6: The system of Example 5, wherein the background job is associated with a management thread that manages the background job, and wherein the one or more threads allocated by the background job includes a job thread that manages the first job and one or more worker threads that fetch the tracking data from the first enterprise software application.

Example 7: The system of any of Examples 1 to 6, wherein the performing of the first job includes generating one or more payloads comprising the tracking data associated with the first enterprise software application before sending the one or more payloads of the tracking data to the second enterprise software application via an event stream processor.

Example 8: The system of any of Examples 1 to 7, wherein the fetch request specifies a first time period defined by a start timestamp and an end timestamp, and wherein the tracking data fetched from the first enterprise software application includes a first historical tracking data from the first specified time period.

Example 9: The system of Example 8, wherein the fetch request further specifies a second time period, and wherein the response to receiving the fetch request further includes determining that the first capacity of the tenant is sufficient to accommodate a second job fetching a second historical tracking data from the second specified time period and distributing the second job to a second instance of the data load microservice selected based at least on a third capacity of the second instance of the data load microservice.

Example 10: The system of any of Examples 1 to 9, wherein the operations further comprise: in response to determining that the first capacity of the tenant is unable to accommodate the first job fulfilling the fetch request, rejecting the fetch request by at least returning an error message to a client device associated with the fetch request.

Example 11: The system of any of Examples 1 to 10, wherein the operations further comprise: in response to determining that the second capacity of the first instance of the data load microservice is unable to accommodate the first job fulfilling the fetch request, rejecting the fetch request by at least returning an error message to a client device associated with the fetch request.

Example 12: A computer-implemented method, comprising: receiving a fetch request to fetch tracking data associated with a first enterprise software application, the tracking data being associated with a tracking model tracking a fulfilment cycle of each order item included in an order; in response to receiving the fetch request, determining whether a first capacity of a tenant associated with the fetch request is able to accommodate a first job fulfilling the fetch request; in response to determining that the first capacity of the tenant is able to accommodate the first job fulfilling the fetch request, distributing the first job to a first instance of a data load microservice selected based at least on a second capacity of the first instance of the data load microservice; and performing, by the first instance of the data load microservice, the first job including by sending the tracking data associated with the first enterprise software application to a second enterprise software application to perform one or more analytical tasks based on at least a portion of the tracking data.

Example 13: The method of Example 12, wherein the first capacity of the tenant comprises a remaining job creation capacity of the tenant determined based at least on a total job creation capacity of the tenant, and wherein the tenant is determined to have sufficient capacity for the first job fulfilling the fetch request based at least on a third capacity required by the first job not exceeding the remaining job creation capacity of the tenant.

Example 14: The method any of Examples 12 to 13, further comprising: selecting the first instance of the data load microservice based at least on the second capacity of the first instance of the data load microservice; and upon selecting the first instance of the data load microservice, creating a job record corresponding to the first job and binding the first job to the first instance of the data load microservice.

Example 15: The method of Example 14, wherein the first instance of the data load microservice is selected based at least on (i) the second capacity of the first instance of the data load microservice satisfying one or more thresholds or (ii) the first instance of the data load microservice having a highest capacity of a plurality of instances of the data load microservice.

Example 16: The method of any of Examples 14 to 15, wherein the first instance of the data load microservice includes a background job that detects when the first job is distributed to the first instance of the data load microservice, and wherein the background job responds to the first job being distributed to the first instance of the data load microservice by at least allocating one or more threads to process the first job and monitoring a status of the first job.

Example 17: The method of Example 16, wherein the background job is associated with a management thread that manages the background job, and wherein the one or more threads allocated by the background job includes a job thread that manages the first job and one or more worker threads that fetch the tracking data from the first enterprise software application.

Example 18: The method of any of Examples 12 to 17, wherein the performing of the first job includes generating one or more payloads comprising the tracking data associated with the first enterprise software application before sending the one or more payloads of the tracking data to the second enterprise software application via an event stream processor.

Example 19: The method of any of Examples 12 to 18, wherein the fetch request specifies a first time period defined by a start timestamp and an end timestamp, wherein the tracking data fetched from the first enterprise software application includes a first historical tracking data from the first specified time period, wherein the fetch request further specifies a second time period, and wherein the response to receiving the fetch request further includes determining that the first capacity of the tenant is sufficient to accommodate a second job fetching a second historical tracking data from the second specified time period and distributing the second job to a second instance of the data load microservice selected based at least on a third capacity of the second instance of the data load microservice.

Example 20: A non-transitory computer readable medium storing instructions, which when executed by at least one data processor, result in operations comprising: receiving a fetch request to fetch tracking data associated with a first enterprise software application, the tracking data being associated with a tracking model tracking a fulfilment cycle of each order item included in an order; in response to receiving the fetch request, determining whether a first capacity of a tenant associated with the fetch request is able to accommodate a first job fulfilling the fetch request; in response to determining that the first capacity of the tenant is able to accommodate the first job fulfilling the fetch request, distributing the first job to a first instance of a data load microservice selected based at least on a second capacity of the first instance of the data load microservice; and performing, by the first instance of the data load microservice, the first job including by sending the tracking data associated with the first enterprise software application to a second enterprise software application to perform one or more analytical tasks based on at least a portion of the tracking data.

Figure 9:
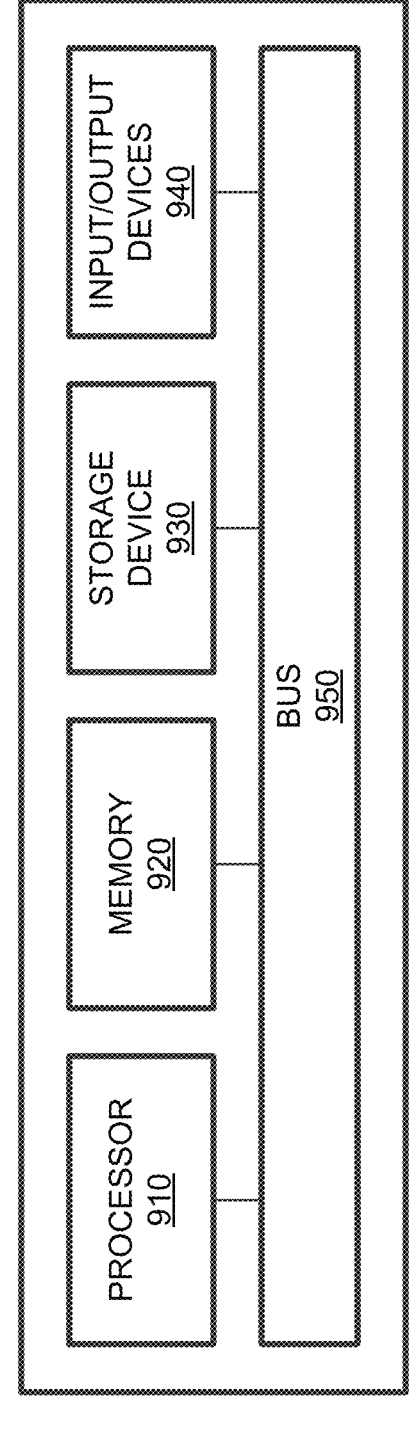
FIG. 9 depicts a block diagram illustrating an example of a computing system, in accordance with some example embodiments.

FIG. 9 depicts a block diagram illustrating a computing system 800, in accordance with some example embodiments. Referring to FIGS. 1-9, the computing system 800 can be used to implement the enterprise software application platform 120, the one or more client devices 130, and/or any components therein.

As shown in FIG. 9, the computing system 800 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 800. Such executed instructions can implement one or more components of, for example, the enterprise software application platform 120, the one or more client devices 130, and/or the like. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 800. The memory 920 can store data structures representing configuration object databases, for example. The storage device 930 is capable of providing persistent storage for the computing system 800. The storage device 930 can be a floppy disk device, a hard disk device, an optical disk device, or a tape device, or other suitable persistent storage means. The input/output device 940 provides input/output operations for the computing system 800. In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 940. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one processor; and at least one memory including program code which when executed by the at least one processor provides operations comprising:

receiving, at an integration microservice comprising the at least one processor and the at least one memory including program code for execution by the at least one processor, a fetch request from a client device to fetch tracking data associated with a first enterprise software application via an application programming interface (API) call to fetch the tracking data from the first enterprise software application, the tracking data being associated with a tracking model tracking a fulfilment cycle of each order item included in an order;

in response to receiving the fetch request, determining, by the integration microservice, whether a first amount of computational resources of a tenant associated with the fetch request is able to accommodate a first job fulfilling the fetch request in part by executing a database query language statement that outputs the first amount of computational resources of the tenant;

in response to determining that the first amount of computational resources of the tenant is able to accommodate the first job fulfilling the fetch request, distributing, by the integration microservice, the first job to a first instance of a data load microservice selected based at least on a second amount of computational resources of the first instance of the data load microservice; and performing, by the first instance of the data load microservice, the first job including by sending the tracking data associated with the first enterprise software application to a second enterprise software application to perform one or more analytical tasks based on at least a portion of the tracking data.

2. The system of claim 1, wherein the first amount of computational resources of the tenant indicates a remaining job creation capacity of the tenant determined based at least on a total job creation capacity of the tenant, and wherein the tenant is determined to have sufficient computational resources for the first job fulfilling the fetch request based at least on a third amount of computational resources required by the first job not exceeding the remaining job creation capacity of the tenant.

3. The system of claim 1, wherein the operations further comprise:

selecting the first instance of the data load microservice based at least on the second amount of computational resources of the first instance of the data load microservice; and upon selecting the first instance of the data load microservice, creating a job record corresponding to the first job and binding the first job to the first instance of the data load microservice.

4. The system of claim 3, wherein the first instance of the data load microservice is selected based at least on (i) the second amount of computational resources of the first instance of the data load microservice satisfying one or more thresholds or (ii) the first instance of the data load microservice having a highest amount of computational resources of a plurality of instances of the data load microservice.

5. The system of claim 3, wherein the first instance of the data load microservice includes a background job that detects when the first job is distributed to the first instance of the data load microservice, and wherein the background job responds to the first job being distributed to the first instance of the data load microservice by at least allocating one or more threads to process the first job and monitoring a status of the first job.

6. The system of claim 5, wherein the background job is associated with a management thread that manages the background job, and wherein the one or more threads allocated by the background job includes a job thread that manages the first job and one or more worker threads that fetch the tracking data from the first enterprise software application.

7. The system of claim 1, wherein the performing of the first job includes generating one or more payloads comprising the tracking data associated with the first enterprise software application before sending the one or more payloads of the tracking data to the second enterprise software application via an event stream processor.

8. The system of claim 1, wherein the fetch request specifies a first time period defined by a start timestamp and an end timestamp, and wherein the tracking data fetched from the first enterprise software application includes a first historical tracking data from the first specified time period.

9. The system of claim 8, wherein the fetch request further specifies a second time period, and wherein the response to receiving the fetch request further includes determining that the first amount of computational resources of the tenant is sufficient to accommodate a second job fetching a second historical tracking data from the second specified time period and distributing the second job to a second instance of the data load microservice selected based at least on a third amount of computational resources of the second instance of the data load microservice.

10. The system of claim 1, wherein the operations further comprise:

US 12,608,678 B2

25                                    26 in response to determining that the first amount of computational resources of the tenant is unable to accommodate the first job fulfilling the fetch request, rejecting the fetch request by at least returning an error message to a client device associated with the fetch request.

11. The system of claim 1, wherein the operations further comprise:

in response to determining that the second amount of computational resources of the first instance of the data load microservice is unable to accommodate the first job fulfilling the fetch request, rejecting the fetch request by at least returning an error message to a client device associated with the fetch request.

12. A computer-implemented method, comprising:

receiving, at an integration microservice comprising at least one processor and at least one memory including program code for execution by the at least one processor, a fetch request from a client device to fetch tracking data associated with a first enterprise software application via an application programming interface (API) call to fetch the tracking data from the first enterprise software application, the tracking data being associated with a tracking model tracking a fulfilment cycle of each order item included in an order;

in response to receiving the fetch request, determining, by the integration microservice, whether a first amount of computational resources of a tenant associated with the fetch request is able to accommodate a first job fulfilling the fetch request in part by executing a database query language statement that outputs the first amount of computational resources of the tenant;

in response to determining that the first amount of computational resources of the tenant is able to accommodate the first job fulfilling the fetch request, distributing, by the integration microservice, the first job to a first instance of a data load microservice selected based at least on a second amount of computational resources of the first instance of the data load microservice; and performing, by the first instance of the data load microservice, the first job including by sending the tracking data associated with the first enterprise software application to a second enterprise software application to perform one or more analytical tasks based on at least a portion of the tracking data.

13. The method of claim 12, wherein the first amount of computational resources of the tenant indicates a remaining job creation capacity of the tenant determined based at least on a total job creation capacity of the tenant, and wherein the tenant is determined to have sufficient computational resources for the first job fulfilling the fetch request based at least on a third amount of computational resources required by the first job not exceeding the remaining job creation capacity of the tenant.

14. The method of claim 12, further comprising:

selecting the first instance of the data load microservice based at least on the second amount of computational resources of the first instance of the data load microservice; and upon selecting the first instance of the data load microservice, creating a job record corresponding to the first job and binding the first job to the first instance of the data load microservice.

15. The method of claim 14, wherein the first instance of the data load microservice is selected based at least on (i) the second amount of computational resources of the first instance of the data load microservice satisfying one or more thresholds or (ii) the first instance of the data load microservice having a highest amount of computational resources of a plurality of instances of the data load microservice.

16. The method of claim 14, wherein the first instance of the data load microservice includes a background job that detects when the first job is distributed to the first instance of the data load microservice, and wherein the background job responds to the first job being distributed to the first instance of the data load microservice by at least allocating one or more threads to process the first job and monitoring a status of the first job.

17. The method of claim 16, wherein the background job is associated with a management thread that manages the background job, and wherein the one or more threads allocated by the background job includes a job thread that manages the first job and one or more worker threads that fetch the tracking data from the first enterprise software application.

18. The method of claim 12, wherein the performing of the first job includes generating one or more payloads comprising the tracking data associated with the first enterprise software application before sending the one or more payloads of the tracking data to the second enterprise software application via an event stream processor.

19. The method of claim 12, wherein the fetch request specifies a first time period defined by a start timestamp and an end timestamp, wherein the tracking data fetched from the first enterprise software application includes a first historical tracking data from the first specified time period, wherein the fetch request further specifies a second time period, and wherein the response to receiving the fetch request further includes determining that the first amount of computational resources of the tenant is sufficient to accommodate a second job fetching a second historical tracking data from the second specified time period and distributing the second job to a second instance of the data load microservice selected based at least on a third amount of computational resources of the second instance of the data load microservice.

20. A non-transitory computer readable medium storing instructions, which when executed by at least one data processor, result in operations comprising:

receiving, at an integration microservice comprising at least one processor and at least one memory including program code for execution by the at least one processor, a fetch request from a client device to fetch tracking data associated with a first enterprise software application via an application programming interface (API) call to fetch the tracking data from the first enterprise software application, the tracking data being associated with a tracking model tracking a fulfilment cycle of each order item included in an order;

in response to receiving the fetch request, determining, by the integration microservice, whether a first amount of computational resources of a tenant associated with the fetch request is able to accommodate a first job fulfilling the fetch request in part by executing a database query language statement that outputs the first amount of computational resources of the tenant;

in response to determining that the first amount of computational resources of the tenant is able to accommodate the first job fulfilling the fetch request, distributing, by the integration microservice, the first job to a first instance of a data load microservice selected based at least on a second amount of computational resources of the first instance of the data load microservice; and performing, by the first instance of the data load microservice, the first job including by sending the tracking data associated with the first enterprise software application to a second enterprise software application to perform one or more analytical tasks based on at least a portion of the tracking data.

* * * * *